United States Patent Office 3,401,123
Patented Sept. 10, 1968

3,401,123
PROCESS FOR MAKING CASE-HARDENED CAPSULES AND ITS CAPSULE PRODUCT
Carl Brynko, West Webster, N.Y., and Joseph A. Bakan, Dayton, Ohio, assignors to The National Cash Register Company, Dayton, Ohio, a corporation of Maryland
No Drawing. Continuation-in-part of application Ser. No. 95,785, Mar. 15, 1961. This application Apr. 27, 1967, Ser. No. 634,107
9 Claims. (Cl. 252—316)

ABSTRACT OF THE DISCLOSURE

A method is provided for pyrolyzing proteinaceous material (such as gelatin) in capsule walls in order to retard swelling of the capsule walls and loss of contents when the walls are exposed to aqueous environments. Capsules which contain partially-water-soluble nuclei within walls which have been pyrolyzed resist swelling and yield their contents, by leaching action in an aqueous environment, only after a delayed time, during which delayed time the treated capsule walls become swollen. Pyrolysis is characterized and indicated by a scorched, browned, or toasted coloration in capsule walls treated by the subject invention.

---

This application is a continuation-in-part application of United States patent application Ser. No. 95,785, filed Mar. 15, 1961, now abandoned.

This invention relates to a process for making small case-hardened capsules having hydrophilic polymeric material walls, and to capsules retarded against swelling in water by reason of being case-hardened.

Oftentimes it is desirable to encapsulate slightly water-soluble materials inside a capsule wall that swells in a water environment so that the encapsulated materials may be leachable therefrom. This invention relates to such a capsule which has been pyrolized to retard such swelling and leaching for a period depending on the depth of the pyrolysis of the capsule walls. "Pyrolysis" refers to chemical decomposition of the capsule wall material by searing heat and is characterized and identified as to degree by a visual browning or scorching of the capsule wall material. The capsule walls are then said to be pyrolyzed.

Capsules made according to this invention are adaptable to many uses, one of the most useful of which is for the introduction of bleach-sensitive textile brighteners into a laundry bath containing a bleaching material. Deleterious effects of a bleaching material of the chlorine type are rapidly dissipated as the bleaching progresses, such taking place in a few minutes. If encapsulated textile brightener materials are introduced into a hot-water laundry bath containing unexhausted bleaching materials, it is desirable that the brightener be physically protected for a few minutes. The brightnere-containing capsules of this invention, among other uses, serve that purpose, and the preferred embodiment of the invention will be disclosed with such purpose in mind.

However, it is to be understood that delayed release of materials from capsules in an aqueous environment is useful in other areas of use, particularly with respect to ingestible pharmaceuticals, food products, and other water-sensitive materials that must be protected in a moist environment.

The capsules made by the preferred process are minute or microscopic in size, but the invention relates to capsules in general regardless of size, the principal feature of the invention being the pyrolysis of the capsule walls to prevent immediate release of capsule contents on contact with water.

Gelatin walls or gelatin-containing walls, gelatin being a protein hydrophilic polymeric material, are considered in the preferred embodiment of the invention, but other hydrophilic protein or protein-like wall-forming materials of hydrophilic polymeric nature are to be considered equivalent materials and within the scope of the invention, whether natural or artificial in part or in whole. Such protein or protein-like hydrophilic polymers become resistant to the swelling action of water when partially decomposed by heat-treatment to a browned or scorched condition after being cross-linked, as will be disclosed.

It is old and well known, at this time, how to make capsules, particularly minute or microscopic capsules, having walls of hydrophilic polymeric material, the contents of such capsules ordinarily being gotten at by physical capsule-rupture as disclosed in United States Letters Patent No. 2,800,457, which issued July 23, 1957, on the application of Barrett K. Green and Lowel Schleicher, and in United States Letters Patent No. 2,800,458, which issued on the same day on the application of Barrett K. Green and which subsequently was reissued as United States Letters Patent Re. 24,899 on Nov. 29, 1960. The capsules of those patents are of microscopic size and have as the contents an oily material which is released by physical rupture of such capsules, as by pressure. Among the uses of such capsules, as indicated in the patents, is to retain marking materials which make marks on paper or other record material. Paper coated with such capsules is disclosed in United States Patent No. 2,730,456, which issued on the application of Barret K. Green and Lowell Schleicher on Jan. 10, 1956. Since then, and as indicated in part in the disclosures of those patents, many other substances have been encapsulated, including, as distinguished from oily marking fluids, such things as non-aqueous materials of the water-immiscible type, solid or liquid, relating to drugs, perfumes, foods, and the like.

In most instances, it is necessary to reduce the water-sensitivity of the walls of such capsules and to render them resistant to temperature above normal room temperature, by treatment wtih cross-linking agents such as formaldehyde and glutaraldehyde, both of which are members of the aldehyde-compound class commonly used in the tanning of gelatin.

The cross-linking of capsule wall proteins, such as gelatin, by the cross-linking agents of the aldehyde type, makes the capsules self-supporting, and such self-supporting structures may be handled individually. Additionally, the cross-linking prevents their partial or complete dissolution in water or other aqueous-like medium. Such treatment, however, does not prevent the swelling of such capsules in an aqueous environment. As is well known, all films of polymeric material are permeable to some degree, being a network of long molecules, and an increase in the permeability of such materials in aqueous media, as a consequence of swelling, permits of the leaching out and escape of water-leachable capsular contents in due course of time.

It is possible, in the method of manufacturing minute capsules, of the kind described, in an aqueous manufacturing vehicle, to include as nucleus material solid particles which have but slight solubility in the aqueous manufacturing medium, inasmuch as such particles of material will dissolve to the saturation point of the aqueous manufacturing vehicle and after that will maintain their solid particle integrity for the application thereto of the liquid capsule wall coating material by deposition, which coatings thereafter are consolidated to a self-supporting gelled conditions as by cooling. Liquid materials which are slightly soluble in water also may be encapsulated by providing enough to saturate the aqueous manufacturing vehicle, the undissolved liquid being left for dispersion as droplets to be so encapsulated.

The invention disclosed herein provides a means for making capsules which contain, as nuclei contents, materials that are slightly water-soluble and which can be leached out by aqueous leaching materials in which they may be immersed to that purpose.

In all of the foregoing disclosed prior art, the manufacturing of the capsules has been carried on in an aqueous liquid medium in which the capsule wall material is dissolved and in which the nucleus material is dispersed, the temperature at which manufacture is carried on being slightly above room temperature and the wall-forming material being caused to separate out of solution by a phenomenon known as coacervation, which coacervation is induced by phase-separating means such as a change in the condition of solubility of the wall-forming materials by the addition of solutes of various kinds or by other changes in conditions.

The capsules made by this invention, in which the already-known aldehyde-hardened capsules are subjected to pyrolysis, find an important use in the prolonged protection of laundry "brightening" agents in an aqueous laundering medium which is maintained substantially at a temperature of about 140 degrees to 150 degrees Fahrenheit. It is the custom, in laundering white textiles, to bleach such to remove stains which are not ordinarily removed by detergents. Such bleaches have an active period, in which they perform their service, and, if used in the proper quantity, are then used up, so that "brighteners" can be introduced without fear of being destroyed by the bleach materials. These "brighteners" ordinarily are dyes of a fluorescent nature and are introduced in the form of solid particulate materials which are water-soluble to a slight degree and which, in aqueous solution, are absorbed in or adsorbed on the textile materials while the laundering process proceeds. Such fluorescent dyes are used in an amount of only a few parts per million with respect to the volume of the water, so potent is their effect in dazzling the eye when such laundered textiles are viewed in natural or artificial light. The "brightener" dye material must be of the low-water soluble type, so that its encapsulation in an aqueous medium will not be interfered with after the saturation point of the vehicle has been attained. The capsule-manufacturing vehicle then becomes a saturated solution of the "brightener" dye with left-over particles still soluble in an unsaturated aqueous environment.

The preferred form of the invention will be disclosed with reference to the encapsulation of such a "brightener" dye, of the triazin-type which is very slightly soluble in water, and which has a molecular formula disodium, 4,4' - bis(4,6 - dianilino - s - triazin - 2 - ylamino) - 2,2'-stilbenedisulfonate, having the structure

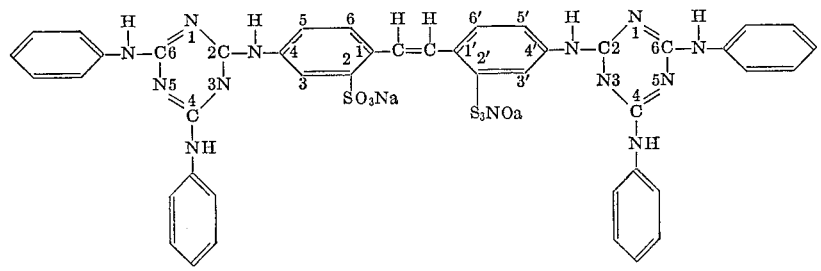

which material is a white solid and which can be ground to a particulate fine form suitable for dispersion and encapsulation in an aqueous vehicle.

This particular dye is known in the literature, and the method of its encapsulation, according to methods used for the encapsulation of other solid particles, is not new; nevertheless, the method of its encapsulation will be described with reference to the particular use of a gelatin-gum arabic complex material as the capsule wall material and to the manufacture of such en masse, on a microscopic scale. This particular mode of making the capsules from a gelatin-gum arabic complex does not limit the scope of the invention, as the invention pertains to all capsules having dry walls containing gelatin, or equivalent material, the swelling characteristics of which in an aqueous medium may be retarded by pyrolysis.

In the novel heat-treatment, completely formed and dried capsule walls are brought to a temperature of from 250 degrees to 300 degrees Fahrenheit, such temperature being maintained for a time sufficient to decompose the capsule wall material to the desired degree as visually determined by its brownness. The degree of decomposition of any particular capsule wall is visually indicated by the degree of browning or scorch coloration of the capsule walls and is a matter to be selectively determined according to the period of retarded release desired. The time of treating the capsules at the pyrolysis temperature is to be considered in view of the thickness of the capsule wall and the depth to which the decomposition with respect to solvability is required or desired. The pyrolysis of the capsules does not render them completely immune to the action of water, as otherwise the whole aim of the invention would be defeated, inasmuch as it is desired in the end, regardless of the retarding period, to leach out the material after the capsules have been introduced into laundering water, which, ordinarily, is in the temperature range of 125 degrees to 150 degrees Fahrenheit. The degree of decomposition of the capsule walls is directly related to the time of pyrolysis treatment and affects the retardation of the release of the capsule contents.

In a large mass of small capsules, the general browning effect serves very well to indicate an average condition, regardless of the appearance of individual capsules. As the capsules so treated are to be used as a mass, the "brown-appearance test" is quite satisfactory.

The preferred embodiment

As a preferred embodiment, there will be described the encapsulation of the particular one of these "brighteners" that has been disclosed, as capsules intended for use in laundering water which is kept at 130 degrees to 140 degrees Fahrenheit and in which a chlorine bleach is to be used in conjunction with the capsules, the bleach acting first to bleach the textiles and then the capsules thereafter releasing the "brightener." It is the object in such combined use of bleach and encapsulated brightener to allow the bleach to function for the necessary several minutes, after which is automatically becomes deactivated and innocuous in its effect upon the "brightener," leaving such later-released "brightener" unharmed and still effective.

Into a vessel are placed 180 grams of an 11 percent, by weight, aqueous solution of gelatin having an isoelectric point of approximately pH 8.9, and having, because of its mode of extraction, a solution pH of 3.5–4; 180 grams of an 11 percent, by weight, aqueous solution of gum arabic having a pH of 3–4; 40 grams of a 2 percent, by weight, aqueous solution of an ethylene-maleic anhydride copolymer, said copolymer having a molecular weight of from 1,000 to 2,000 as determined by its viscosity as a 1 percent solution in dimethyl formamide at 25 degrees centigrade, according to the Ostwald method "B," such copolymer now being obtainable in the United States of America from Monsanto Chemical Company under the trade name designation formerly "DX843-11" but now "EMA-11; and 40 grams of a 2 percent, by weight, aqueous solution of ethylene-maleic anhydride copolymer, the copolymer having a molecular weight of 60,000 to 70,000, as determined by the viscosity method mentioned just previously, and obtained from Monsanto Chemical Company under the trade name designation formerly "DX843-31" but now "EMA-31," and, after adding a liter of water and maintaining the temperature at 45 degrees centigrade, the pH of the mixture is adjusted to 9, all with agitation, which is continued during the addition of the "brightener" to be described. To the agitated mixture is added 80 grams of the triazin dye, the formula of which has been given, in fine particle form, the preferred average dimension of the particles being about 5 microns. The pH of the mixture-dispersion then is adjusted to 6 with a 10 percent, by weight, aqueous solution of acetic acid, and aggregate capsules having liquid walls will form. The aggregates are permitted to attain a size of about 20 microns in average largest dimension by controlling the degree and time of agitation. Each of the aggregate capsule components will contain a particle of the triazin dye. The whole operation need not consume more than fifteen minutes. The system then is allowed to cool, with continued agitation, until room temperature is reached, after which the temperature of the system is reduced on an ice bath to 10 degrees centigrade, and, with continued agitation, the pH is adjusted to 4, by the same strength acetic acid solution. To this system is added, slowly, 10 milliliters of a 25 percent, by weight, aqueous solution of glutaraldehyde, and the system is kept in agitation overnight or until the walls of the capsules and their aggregates become firm and self-supporting due to cross-linking. These aggregates are recovered from the manufacturing vehicle, as by filtration and spray-drying in a column of hot air, the temperature of which is not so great as to destroy the integrity of the aggregates of capsules.

The pyrolysis treatment of the capsule walls, which contain a large percentage of gelatin, is carried out by spreading the dry capsules in a more or less single layer on a heat-proof tray and placing them in an oven at 265 degrees Fahrenheit, which temperature is maintained for about three hours until the capsule walls appear done, by their brown coloration. The capsules are now complete, with the "brightener" materials protected against ordinary room environment, even if humid. When these capsules are introduced into warm water (that is to say, water of a temperature of 130 degrees to 140 degrees Fahrenheit), and after an induction immersion period of three to four minutes, the capsules swell, and the "brightener" is leached out slowly. Capsules of the same kind without the pyrolysis treatment begin to swell immediately in such warm water, so that the warm water begins to leach out the "brightener" in the presence of unreacted bleaching material if such is present, destroying the effectiveness of the "brightener."

Inasmuch as only three parts per million of dye in the laundry water is necessary for a satisfactory brightening effect, it is apparent that the low solubility of the dye in an aqueous medium is of little importance. The laundry water accepts a certain amount of the dye in solution, and, therefore, only a small amount of capsules is necessary to be introduced into a laundry bath to create a condition of saturation thereof.

In the use of the capsules made according to the preferred embodiment, it is contemplated that they be used by being introduced with or at the same time the other laundering aids are introduced, to save the operator the task of timing the introduction of the "brightener."

It is apparent that the foregoing has disclosed a method of using a slightly soluble solid particulate material as a capsule nucleus in minute capsules having hydrophilic polymer walls which have been changed from an immediately fully solvatable condition to a condition in which the full solvation of the walls is delayed for a period of time, measured in minutes, in warm laundering water.

The temperature of pyrolysis may vary greatly, as between 250 degrees and 300 degrees Fahrenheit.

The invention was made in developing a means to encapsulate materials so that they could be introduced into an aqueous laundering medium at the same time as the bleach is introduced, but the invention is not restricted to such use. In its larger aspect, the invention relates to increasing the resistance of the gelatin-walled capsules, or capsules with walls having a gelatin content, to the solvating action of water, which action normally increases the permeability thereof immediately. Such delayed solvating characteristics of capsule walls may be used in capsules intended for use in other than laundering environments.

It is within the scope of the invention to introduce other than "brightener" materials into laundering solutions, inasmuch as capsules of different solvating characteristics, with respect to time, may be made by varying the time during which capsules are subjected to the pyrolysis step, the less time at the pyrolysis temperature providing capsules with a lesser degree of solvation resistance than if left for a longer period. Capsules of different solubility characteristics, including those of the same capsular contents and those of different capsular contents, may be mixed together in a laundering preparation, with or without the bleaching materials, to form a complex mixture of capsules which merely requires a single addition thereof to the laundering bath in order to obtain certain results which must be carried out by introducing the different capsule contents in a certain time sequence to get the best effect.

Beyond all the foregoing applications of such capsules in laundering, these capsules with increased resistance to solvation in an aqueous medium may be used for purposes entirely different from the use of them for introducing laundering aids into a laundering bath, such as for the purpose of the delayed release of solid or liquid materials which have no relation to dyestuffs. Many oils and solid materials of various kinds that are slightly soluble in water may be encapsulated in these hot-water-solvatable capsules, and the contained materials may be leached therefrom after an induction period in an aqueous medium, during which the pyrolyzed capsule wall material has a chance to absorb water and become swollen to a leachably-permeable condition. In all of these instances, the pyrolysis treatment of the gelatin portion of the wall material is the factor which permits of the presence of the capsules in relatively warm water for a period of time, which time is calculated in minutes, before the release of the encapsulated material by leaching action occurs. The insolubilizing effect of temperature on proteinaceous material, such as the gelatin which has been under discussion, is well known, and such phenomenon occurs where different types of hydrophilic polymeric materials of the proteinaceous type are used in conjunction with other materials for making capsule walls, the gelatin content serving its insolubilizing purpose according to the amount present.

Treatment conditions and materials for practice of this invention can vary over appreciable ranges. The nature and the humidity of a gaseous heat-treating environment and whether or not the gas is circulated in an oven are examples of such variable conditions. The quality, the concentration, and the kind of component polymeric materials found in the capsule walls to be treated is a further example of possible variations. Pyrolysis of capsule walls, which is the result of the novel treatment, is easily identified by the mentioned brown coloration of the treated capsule walls, and the degree of pyrolysis can be estimated by the degree of "browning." Observation of the degree of capsule wall browning is specified herein as a test to determine whether the capsules are "done" (whether the treatment is completed to the point desired) because such a browning test is easily within the skill of anyone familiar with the art and, in fact, is familiar to the general public as well. Such an empirical test is especially useful because it relies on the resultant condition of treated capsule walls alone and does not rely on the various characteristics of treatment, such as temperature of environment or kind of capsule wall.

What is claimed is:

1. In a process for making capsules comprising the steps of depositing a liquid capsule wall of hydrophilic polymeric material around each of a plurality of slightly water-soluble nuclei, consolidating the liquid capsule walls by gelation, cross-linking the capsule walls, and drying the capsule walls, the additional step which comprises heating said cross-linked dried capsule walls to a capsule-wall-scorching and -decomposing temperature for a time sufficient to brown the capsule walls to delay swelling of the browned walls when the capsules are introduced into an aqueous environment.

2. In a process for making capsules comprising the steps of depositing a liquid capsule wall of gelatin-containing material around each of a plurality of slightly water-soluble nuclei, consolidating the liquid capsule walls by gelation, cross-linking the capsule walls, and drying the capsule walls, the additional step of treating the gelatin-containing capsule walls to delay swelling of the walls when the capsules are introduced into an aqueous environment; the treatment comprising the step of heating the capsule walls to a capsule wall decomposing temperature for a time sufficient to scorch the capsule walls to a brown condition.

3. The process of claim 1 wherein the capsule temperature reaches from 250 degrees to 300 degrees Fahrenheit.

4. The process of claim 3 wherein the hydrophilic polymeric material comprises gelatin.

5. The process of claim 4 wherein the nuclei are particles of a solid dye.

6. The process of claim 5 wherein the solid dye is a textile "brightener."

7. The process of claim 6 wherein the textile brightener is disodium 4,4'-bis (4,6-dianilino-s-triazin-2-ylamino)-2,2'-stilbenedisulfonate.

8. The product of the process of claim 1.

9. The product of the process of claim 6.

References Cited

UNITED STATES PATENTS

| | | | |
|---|---|---|---|
| 2,451,022 | 10/1948 | Dohrmann | 167—83 X |
| 2,800,457 | 7/1957 | Green et al. | 252—316 |
| 2,945,762 | 7/1960 | Carroll et al. | 260—249.8 X |
| 2,953,454 | 9/1960 | Berman | 167—83 X |
| 3,016,308 | 1/1962 | Macaulay | 252—316 X |
| 3,043,782 | 7/1962 | Jensen | 252—316 |

LEON D. ROSDOL, *Primary Examiner.*

R. D. LOVERING, *Assistant Examiner.*